US011176233B2

(12) United States Patent
Liu et al.

(10) Patent No.: US 11,176,233 B2
(45) Date of Patent: Nov. 16, 2021

(54) METHOD AND DEVICE FOR IDENTITY AUTHENTICATION

(71) Applicant: Advanced New Technologies Co., Ltd., Grand Cayman (KY)

(72) Inventors: Jiayin Liu, Hangzhou (CN); Lei Wang, Hangzhou (CN)

(73) Assignee: Advanced New Technologies Co., Ltd., Grand Cayman (KY)

( * ) Notice: Subject to any disclaimer, the term of this patent is extended or adjusted under 35 U.S.C. 154(b) by 0 days.

(21) Appl. No.: 16/212,210

(22) Filed: Dec. 6, 2018

(65) Prior Publication Data

US 2019/0114407 A1  Apr. 18, 2019

Related U.S. Application Data

(63) Continuation of application No. PCT/CN2017/086051, filed on May 26, 2017.

(30) Foreign Application Priority Data

Jun. 7, 2016  (CN) .......................... 201610403643.X (51) Int. Cl.
  *G06F 21/32* (2013.01)
  *G06F 21/45* (2013.01)
  (Continued)

(52) U.S. Cl.
  CPC .............. *G06F 21/32* (2013.01); *G06F 21/45* (2013.01); *G06F 21/62* (2013.01); *H04L 9/3231* (2013.01); *H04L 29/06* (2013.01); *H04L 63/0861* (2013.01)

(58) Field of Classification Search
  CPC .......... G06F 21/32; G06F 21/62; G06F 21/45; H04L 29/06; H04L 9/3231; H04L 63/0861
  See application file for complete search history.

(56) References Cited

U.S. PATENT DOCUMENTS 6,256,402 B1   7/2001 Terao
6,944,773 B1 * 9/2005 Abrahams ............. H04L 9/3231
                                                        713/168

(Continued)

FOREIGN PATENT DOCUMENTS

CN       102279923       12/2011
CN       103595719        2/2014

(Continued)

OTHER PUBLICATIONS

International Search Report by the International Searching Authority issued in International Application No. PCT/CN2017/086051 dated Jul. 27, 2017; 12 pages.

(Continued)

*Primary Examiner* — Abu S Sholeman
(74) *Attorney, Agent, or Firm* — Fish & Richardson P.C.

(57) ABSTRACT

The present disclosure discloses a method and device for identity authentication. One example method includes retrieving stored fingerprint information for a user including a plurality of recorded fingerprints for the user, each recorded fingerprint associated with a different finger of the user; selecting a subset of the recorded fingerprints to be used to authenticate the user; prompting the user to provide fingerprint information corresponding to each finger associated with a recorded fingerprint in the selected subset; in response to prompting the user, receiving user-provided fingerprint information from the user; matching the user-provided fingerprint information against the selected subset of the recorded fingerprints; and determining that an identity authentication of the user succeeds when the user-provided fingerprint information matches the selected subset of the recorded fingerprints.

6 Claims, 8 Drawing Sheets

(51) Int. Cl.
*H04L 29/06* (2006.01)
*G06F 21/62* (2013.01)
*H04L 9/32* (2006.01)

(56) References Cited

U.S. PATENT DOCUMENTS

| | | | | |
|---|---|---|---|---|
| 6,961,738 | B1* | 11/2005 | Uchida | G06F 21/32 |
| 7,136,514 | B1* | 11/2006 | Wong | G06K 9/00026 |
| | | | | 382/124 |
| 7,185,193 | B2* | 2/2007 | Watanabe | G06F 21/32 |
| | | | | 713/155 |
| 7,698,322 | B1* | 4/2010 | Langley | G06Q 50/26 |
| | | | | 707/692 |
| 9,300,661 | B1* | 3/2016 | O'Malley | H04L 63/0838 |
| 9,876,788 | B1 | 1/2018 | Ziraknejad et al. | |
| 2001/0043726 | A1 | 11/2001 | Ikebata et al. | |
| 2001/0049785 | A1* | 12/2001 | Kawan | G06Q 20/3674 |
| | | | | 713/156 |
| 2005/0134427 | A1 | 6/2005 | Hekimian | |
| 2008/0034411 | A1* | 2/2008 | Aoyama | H04L 63/0861 |
| | | | | 726/5 |
| 2010/0026451 | A1* | 2/2010 | Erhart | G06F 21/32 |
| | | | | 340/5.53 |
| 2011/0126280 | A1 | 5/2011 | Asano | |
| 2012/0120013 | A1 | 5/2012 | Kurz | |
| 2014/0233855 | A1 | 8/2014 | Clarke | |
| 2015/0006778 | A1 | 1/2015 | Leo et al. | |
| 2015/0074796 | A1* | 3/2015 | Meir | H04L 63/0861 |
| | | | | 726/19 |
| 2015/0154392 | A1* | 6/2015 | Bao | G06F 21/36 |
| | | | | 726/19 |
| 2015/0278495 | A1* | 10/2015 | Yu | G06F 21/32 |
| | | | | 713/186 |
| 2016/0063230 | A1* | 3/2016 | Alten | G06F 21/32 |
| | | | | 726/28 |
| 2016/0110529 | A1 | 4/2016 | Mathew | |
| 2016/0164866 | A1* | 6/2016 | Oberheide | H04L 63/0876 |
| | | | | 726/1 |
| 2016/0342784 | A1* | 11/2016 | Beveridge | G06F 21/34 |
| 2017/0011252 | A1* | 1/2017 | Yang | A61B 8/54 |
| 2020/0134153 | A1 | 4/2020 | Liu et al. | |

FOREIGN PATENT DOCUMENTS

| | | |
|---|---|---|
| CN | 104751038 | 7/2015 |
| CN | 105354464 | 2/2016 |
| CN | 105530230 | 4/2016 |
| CN | 106778214 | 5/2017 |
| JP | H1153540 | 2/1999 |
| JP | 2003248662 | 9/2003 |
| JP | 2004102446 | 4/2004 |
| JP | 2014241058 | 12/2014 |
| JP | 2015049543 | 3/2015 |
| KR | 20020039049 | 5/2002 |
| KR | 101052936 | 7/2011 |

OTHER PUBLICATIONS

European Extended Search Report in European Patent Application No. 17809638.4, dated May 9, 2019, 7 pages.

Crosby et al., "BlockChain Technology: Beyond Bitcoin," Sutardja Center for Entrepreneurship & Technology Technical Report, Oct. 16, 2015, 35 pages.

Nakamoto, "Bitcoin: A Peer-to-Peer Electronic Cash System," www.bitcoin.org, 2005, 9 pages.

PCT International Preliminary Report on Patentability in Internaitonal Application No. PCT/CN2017/086051, dated Dec. 11, 2018, 12 pages (with English translation).

PCT Written Opinion of the International Searching Authority in Internaitonal No. PCT/CN2017/086051, dated Jul. 27, 2017, 11 pages (with English translation).

* cited by examiner

METHOD AND DEVICE FOR IDENTITY AUTHENTICATION

CROSS-REFERENCE TO RELATED APPLICATIONS

This application is a continuation of PCT Application No. PCT/CN2017/086051, filed on May 26, 2017, which claims priority to Chinese Patent Application No. 201610403643.X, filed on Jun. 7, 2016, and each application is hereby incorporated by reference in its entirety.

TECHNICAL FIELD

The present disclosure relates to the field of information security technologies, and in particular, to a method and device for identity authentication.

BACKGROUND

With continuous development of information technologies, recognition of biometric features (faces, fingerprints, irises, etc.) is gradually applied to the electronic field and the access control system. It is convenient to use biometric recognitions for encryption or decryption, so that there is no need to enter passwords. In addition, because biometric features of users are unique, biometric feature keys usually cannot be replicated, stolen, or forgotten, which can reduce the risks of identity theft.

Compared with recognition of biometric features such as faces and irises, fingerprint recognition is relatively simple, and therefore, fingerprint recognition technologies are particularly popular. Currently, when a user's fingerprint is used for identity authentication, a fixed fingerprint is usually used. For example, a user's fingerprint can be repeatedly used for different mobile phone applications that require identity authentications, such as mobile payment.

However, identity authentication performed by using the fixed fingerprint information is very risky and less secure, and cannot satisfy a user requirement for relatively high privacy or security.

SUMMARY

In view of this, implementations of the present disclosure provide a method and device for identity authentication, so as to resolve a problem that identity authentication performed by using a fixed fingerprint is very risky and less secure, and cannot satisfy a user requirement for relatively high privacy or security.

To achieve the earlier described objectives, the following technical solutions are used in the present disclosure:

According to a first aspect, the present disclosure provides a method for identity authentication, including: selecting a predetermined amount of fingerprint information from a user's plurality of recorded fingerprints; receiving a predetermined amount of fingerprint information successively entered by the user based on fingerprint input prompt information; matching the received predetermined amount of fingerprint information against the selected predetermined amount of fingerprint information; and confirming that identity authentication succeeds when the received predetermined amount of fingerprint information matches the selected predetermined amount of fingerprint information.

According to another aspect, the present disclosure provides a device for identity authentication, including: a selection unit, configured to select a predetermined amount of fingerprint information from a user's plurality of recorded fingerprints; a receiving unit, configured to receive a predetermined amount of fingerprint information successively entered by the user based on fingerprint input prompt information; a matching unit, configured to match the received predetermined amount of fingerprint information against the selected predetermined amount of fingerprint information; and a confirmation unit, configured to confirm that identity authentication succeeds when the received predetermined amount of fingerprint information matches the selected predetermined amount of fingerprint information.

By using the previously described technical solutions, the technical solutions provided in the implementations of the present disclosure have at least the following advantages:

According to a method and device for identity authentication provided in the implementations of the present disclosure, when identity authentication needs to be performed, a predetermined amount of fingerprint information is first selected from a user's plurality of recorded fingerprints; then, a predetermined amount of fingerprint information successively entered by the user based on fingerprint input prompt information is received; next, the received predetermined amount of fingerprint information is matched against the selected predetermined amount of fingerprint information; and it is confirmed that identity authentication succeeds when the received predetermined amount of fingerprint information matches the selected predetermined amount of fingerprint information. Compared with a current method that only a fixed fingerprint is used for identity authentication, in the present disclosure, a plurality of pieces of fingerprint information of a user are recorded, so that when the user needs securer operation behavior, a predetermined amount of fingerprint information can be selected from the plurality of recorded fingerprints, the user is prompted to enter fingerprint information of a corresponding finger, and a corresponding operation can be completed when the fingerprint information totally matches. It increases identity authentication complexity, improves security, and can satisfy a user requirement for relatively high privacy or security.

The description is merely an overview of the technical solutions of the present disclosure. To more clearly understand the technical means of the present disclosure to implement the content of the specification, and to make the previous and other objectives, features, and advantages of the present disclosure more comprehensible, the following lists specific implementations of the present disclosure.

BRIEF DESCRIPTION OF DRAWINGS

By reading detailed descriptions of the following preferred implementations, a person skilled in the art clearly understands various other advantages and benefits. Accompanying drawings are merely used to show objectives of the preferred implementations, but are not considered as a limitation on the present disclosure. In addition, the same reference numeral is used to indicate the same part in all accompanying drawings. In the accompanying drawings.

DESCRIPTION OF IMPLEMENTATIONS

The following describes the example implementations of the present disclosure in more detail with reference to the accompanying drawings. Although the accompanying drawings show example implementations of the present disclosure, it should be understood that the implementations can be implemented in various forms, and shall not be limited by the implementations described here. Instead, these implementations are provided to make a person skilled in the art more thoroughly understand the present disclosure and the scope of the present disclosure.

Figure 1:
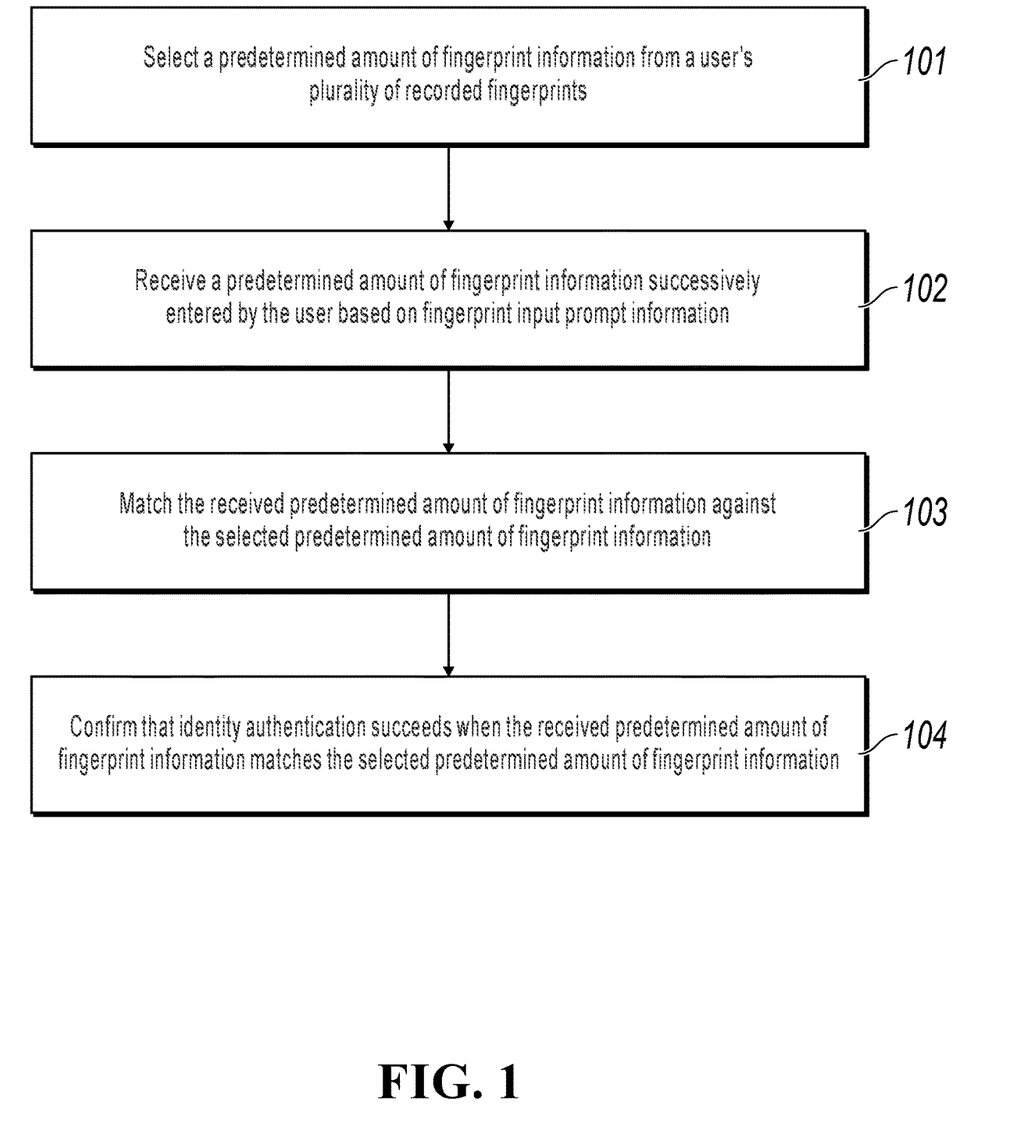
FIG. 1 is a flowchart illustrating a method for identity authentication, according to an implementation of the present disclosure.

An implementation of the present disclosure provides a method for identity authentication. As shown in FIG. 1, the method includes the following steps.

101. Select a predetermined amount of fingerprint information from a user's plurality of recorded fingerprints.

The predetermined amount can be configured based on an actual requirement. For example, the predetermined amount can be set to 2 or 3.

In the present implementation of the present disclosure, the plurality of pieces of fingerprint information of the user can be recorded in advance. When fingerprint information is recorded, fingerprint identification information corresponding to the fingerprint information also needs to be recorded, and the fingerprint identification information can be name, an identity (ID) number, etc. of a fingerprint. For example, fingerprint information corresponding to the user's left ring finger, fingerprint information corresponding to the left index finger, and fingerprint information corresponding to the right thumb are recorded.

The predetermined amount of fingerprint information can be randomly selected from the plurality of recorded fingerprints in a random selection sequence, or the predetermined amount of fingerprint information can be randomly selected from the plurality of recorded fingerprints in a predetermined selection sequence of the system.

In the present implementation of the present disclosure, when identity authentication of a high importance level needs to be performed in product interaction, the system starts advanced authentication. As such, step 101 can be triggered.

102. Receive a predetermined amount of fingerprint information successively entered by the user based on fingerprint input prompt information.

The fingerprint input prompt information is used to prompt to enter the fingerprint information corresponding to the fingerprint identification information. The fingerprint input prompt information can be text prompt information, picture prompt information, audio prompt information, video prompt information, etc. Further, the user can enter corresponding fingerprint information based on the fingerprint input prompt information.

Figure 2:
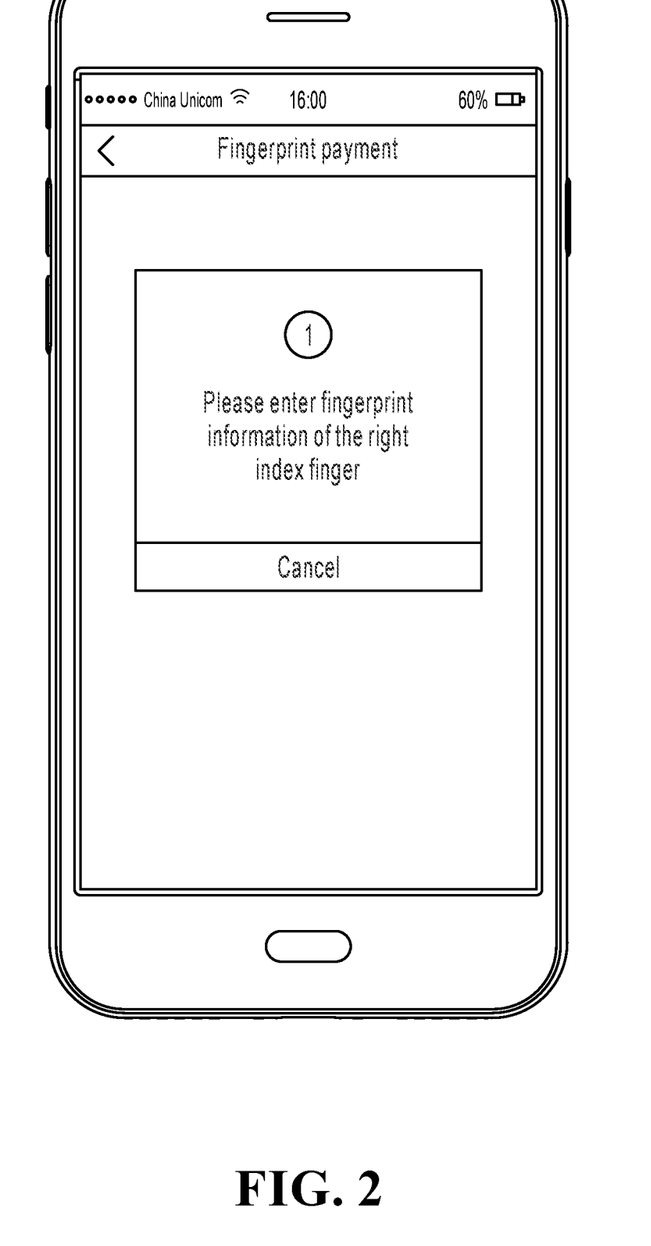
FIG. 2 is a diagram illustrating a mobile phone screen of an operation instance, according to an implementation of the present disclosure.
Figure 3:
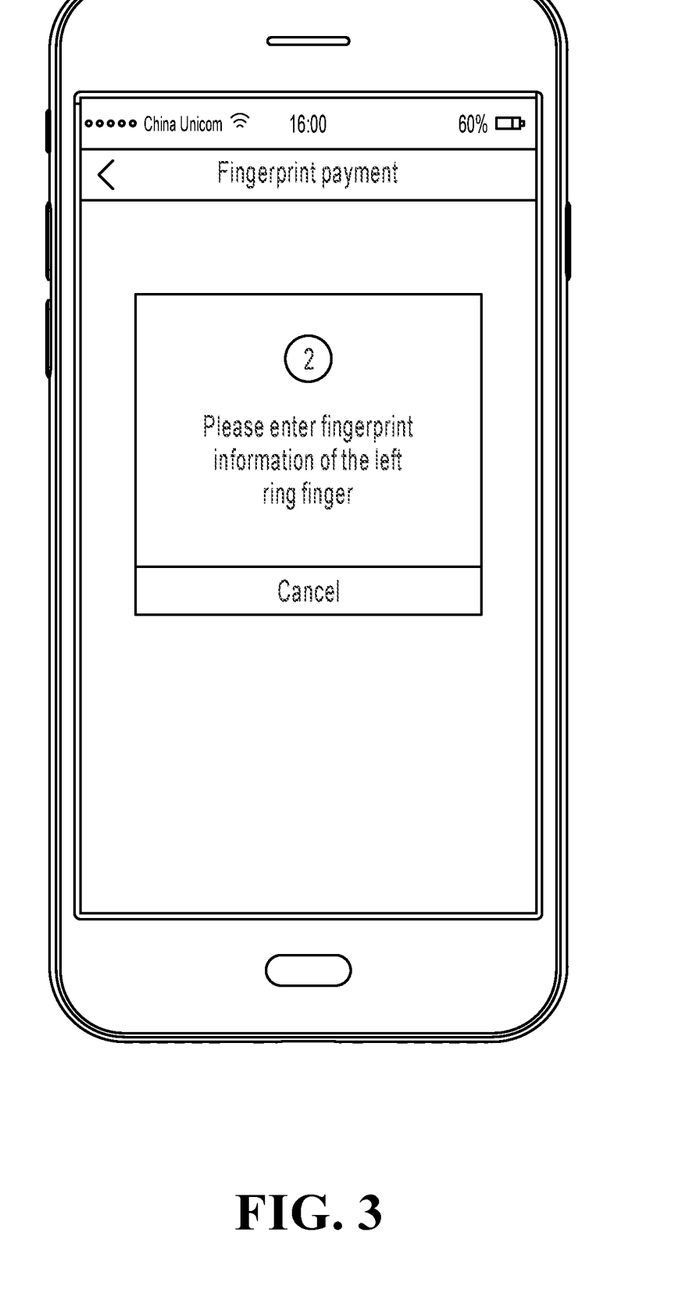
FIG. 3 is a diagram illustrating a mobile phone screen of an operation instance, according to an implementation of the present disclosure.

For example, when the user needs to perform payment by using fingerprints on a mobile phone, the system randomly selects two pieces of fingerprint information: fingerprint information of the right index finger and fingerprint information of the left ring finger. As shown in FIG. 2, the system outputs prompt information "please enter fingerprint information of the right index finger" for the first time, and the user enters the fingerprint information of the right index finger of the user based on the prompt information. After the system receives the fingerprint information entered by the user, as shown in FIG. 3, the system outputs prompt information "please enter fingerprint information of the left ring finger" for the second time, and the user enters the fingerprint information of the left ring finger of the user based on the prompt information.

103. Match the received predetermined amount of fingerprint information against the selected predetermined amount of fingerprint information.

In the present implementation of the present disclosure, each received fingerprint information can be matched against fingerprint information entered in response to a prompt request. For example, after the fingerprint information entered by the user is received, the fingerprint information is matched against fingerprint information entered in response to a current prompt request, if the fingerprint information matches the fingerprint information entered in response to the current prompt request, next fingerprint information to be entered is prompted; and if the fingerprint information does not match the fingerprint information entered in response to the current prompt request, an identity authentication failure is prompted. Alternatively, after the predetermined amount of fingerprint information is received, the predetermined amount of fingerprint information is matched against the selected predetermined amount of fingerprint information. For example, the predetermined amount is 3, and after three pieces of fingerprint information entered by the user are received, the three pieces of fingerprint information are matched against selected three pieces of fingerprint information.

104. Confirm that identity authentication succeeds when the received predetermined amount of fingerprint information matches the selected predetermined amount of fingerprint information.

Figure 4:
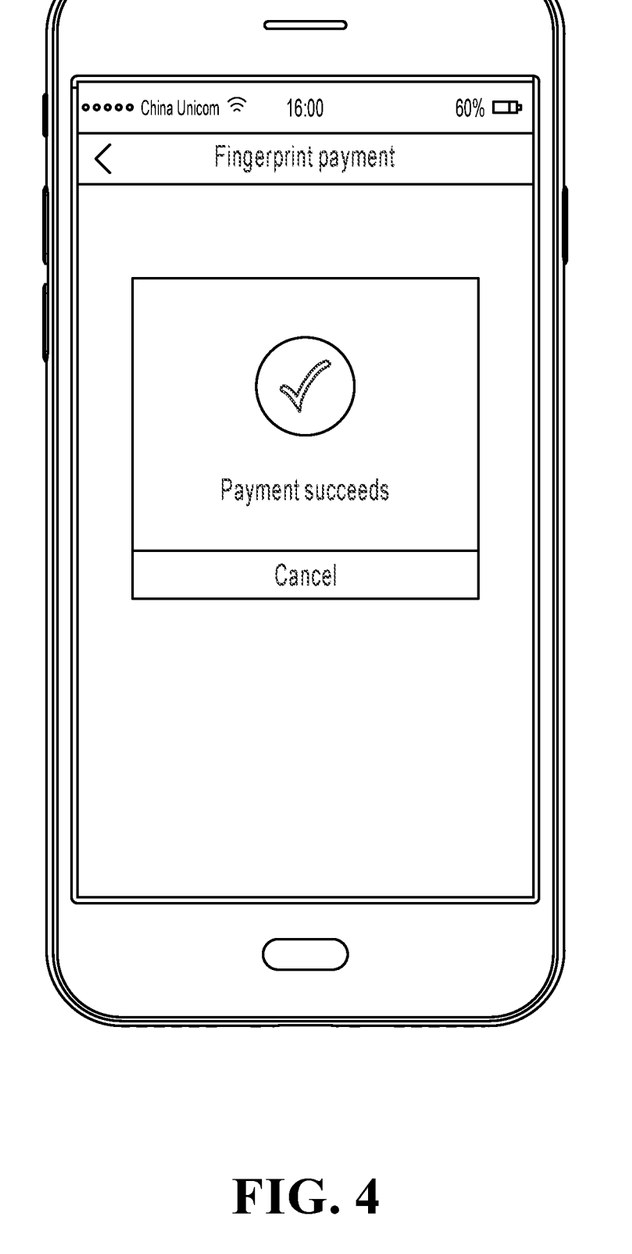
FIG. 4 is a diagram illustrating a mobile phone screen of an operation instance, according to an implementation of the present disclosure.

For example, when the user needs to perform fingerprint payment by using a mobile phone, the system randomly selects three pieces of fingerprint information: fingerprint information of the left thumb, the left index finger, and the right thumb. The system prompts to enter fingerprint information of the left thumb for the first time. When the system detects that the fingerprint information entered by the user matches recorded fingerprint information of the left thumb, the system prompts to enter fingerprint information of the left index finger for the second time. When the system detects that the fingerprint information entered by the user matches recorded fingerprint information of the left index finger, the system prompts to enter fingerprint information of the right thumb for the third time. When the system detects that the fingerprint information entered by the user matches recorded fingerprint information of the right thumb, it indicates that the received fingerprint information matches the fingerprint information entered in response to the prompt request, and user identity authentication succeeds. As such, fingerprint payment can be completed, and prompt information indicating that payment succeeds is prompted. Details are shown in FIG. 4.

According to a method for identity authentication provided in the present implementation of the present disclosure, when identity authentication needs to be performed, a predetermined amount of fingerprint information is first selected from a user's plurality of recorded fingerprints; then, a predetermined amount of fingerprint information successively entered by the user based on fingerprint input prompt information is received; next, the received predetermined amount of fingerprint information is matched against the selected predetermined amount of fingerprint information; and it is confirmed that identity authentication succeeds when the received predetermined amount of fingerprint information matches the selected predetermined amount of fingerprint information. Compared with a current method that only a fixed fingerprint is used for identity authentication, in the present disclosure, a plurality of pieces of fingerprint information of a user are recorded, so that when the user needs high security level operation behavior, a predetermined amount of fingerprint information can be selected from the plurality of recorded fingerprints, the user is prompted to enter fingerprint information of a corresponding finger, and a corresponding operation can be completed only when the fingerprint information totally matches. It increases identity authentication complexity, improves security, and can satisfy a user requirement for relatively high privacy or security.

Figure 5:
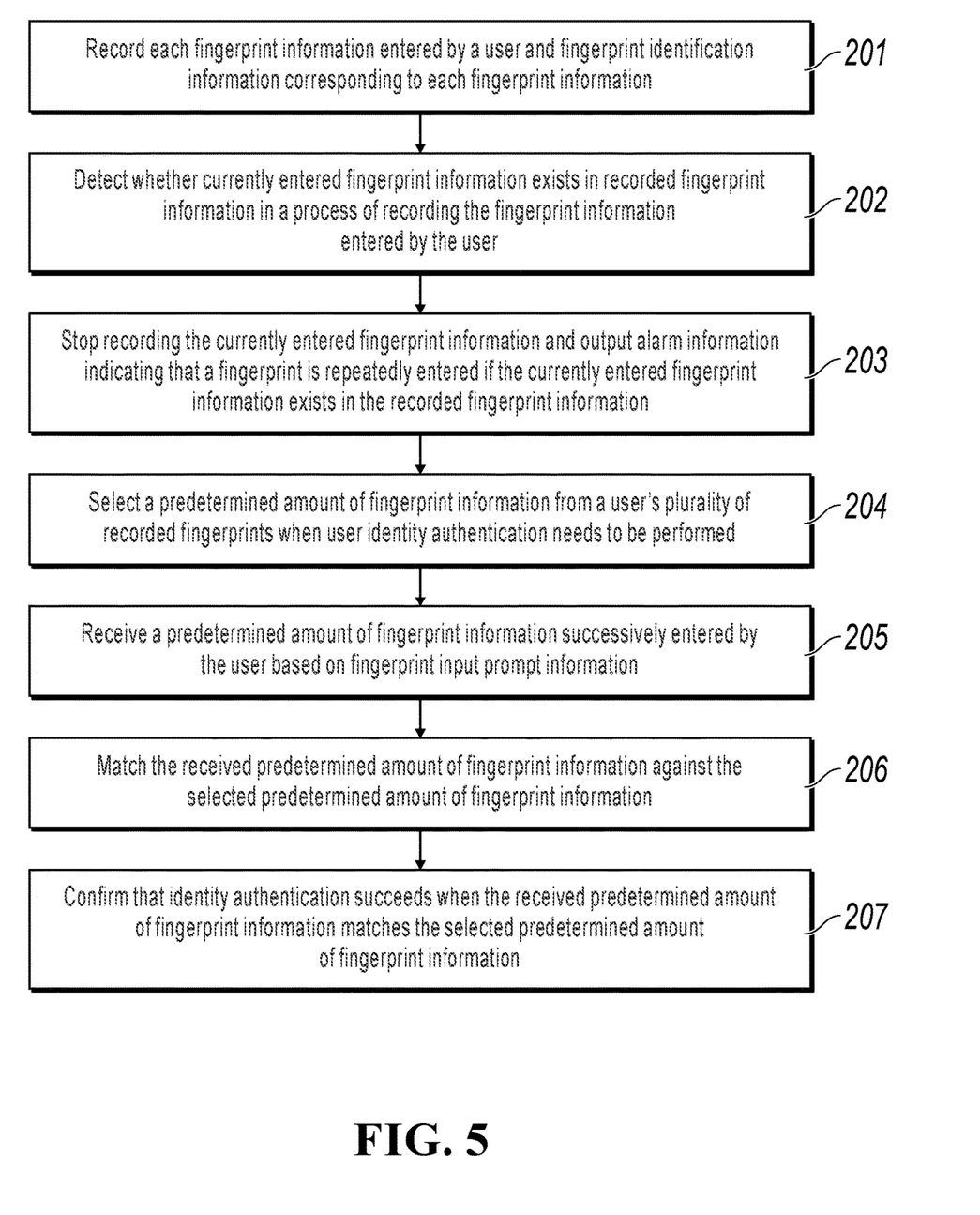
FIG. 5 is a flowchart illustrating another method for identity authentication, according to an implementation of the present disclosure.

Further, an implementation of the present disclosure provides another method for identity authentication. As shown in FIG. 5, the method includes the following steps.

201. Record each fingerprint information entered by a user and fingerprint identification information corresponding to each fingerprint information.

The fingerprint identification information can be name, ID number, etc. of a fingerprint, for example, the fingerprint of the left ring finger and the fingerprint of the right little finger.

In the present implementation of the present disclosure, each fingerprint information entered by the user and fingerprint identification information corresponding to each fingerprint information can be recorded in advance for invoking during user identity authentication.

In a process of recording the fingerprint information entered by the user, the fingerprint information corresponding to the fingerprint identification information that needs to be entered can be prompted, so that the fingerprint information of the user and the fingerprint identification information corresponding to the fingerprint information are recorded. For example, when fingerprint information of the left index finger that needs to be entered is prompted, the user can enter the fingerprint information of the left index finger based on the prompt information, and the system records the fingerprint information and a left index finger identifier corresponding to the fingerprint information.

After the user enters the fingerprint information, each fingerprint identification information can be output, so that the user selects the currently entered fingerprint information that can be recorded by the system as fingerprint information of which finger.

202. Detect whether currently entered fingerprint information exists in recorded fingerprint information in a process of recording the fingerprint information entered by the user.

It is worthwhile to note that if the currently entered fingerprint information does not exist in the recorded fingerprint information, it indicates that the currently entered fingerprint information has not been recorded, is newly entered fingerprint information, and can be recorded by the system.

203. Stop recording the currently entered fingerprint information and output alarm information indicating that a fingerprint is repeatedly entered if the currently entered fingerprint information exists in the recorded fingerprint information.

The alarm information can be text alarm information, picture alarm information, audio alarm information, video alarm information, etc.

It is worthwhile to note that if the currently entered fingerprint information exists in the recorded fingerprint information, it indicates that the currently entered fingerprint information has been recorded, and there is no need to record the fingerprint information, and then recording the currently entered fingerprint information is stopped and the alarm information indicating that a fingerprint is repeatedly entered is output, thereby prompting the user to change a finger for fingerprint information entering.

204. Select a predetermined amount of fingerprint information from a user's plurality of recorded fingerprints when user identity authentication needs to be performed.

The predetermined amount can be configured based on an actual demand. In the present implementation of the present disclosure, when relatively high privacy or security is needed, the predetermined amount can be larger, and when relatively low privacy or security is needed, the predetermined amount can be smaller.

In the present implementation of the present disclosure, before step 204, the method further includes detecting whether the user currently logs in; and if no, outputting prompt information prompting the user to log in by using an account. The prompt information can be text prompt information, picture prompt information, audio prompt information, video prompt information, etc. Step 204 includes: if yes, obtaining login account information of the user; and selecting a predetermined amount of fingerprint information from a plurality of recorded fingerprints corresponding to the account information.

It is worthwhile to note that in the present implementation of the present disclosure, in a process of recording user's fingerprint information, a plurality of pieces of fingerprint information respectively corresponding to different users can be recorded based on user account information. When user identity authentication needs to be performed, a plurality of recorded fingerprints corresponding to a user can be determined based on login account information of the user, and a predetermined amount of fingerprint information can be selected, so as to perform identity authentication on different users.

In the present implementation of the present disclosure, after step 204, the method further includes outputting prompt information based on fingerprint identification information corresponding to the fingerprint information in a predetermined fingerprint recognition sequence or a random recognition sequence, so as to satisfy requirements of different users. The predetermined fingerprint recognition sequence can be preconfigured based on an actual demand. For example, to facilitate a user operation, the predetermined fingerprint recognition sequence can be configured as preferentially prompting to enter selected left hand fingerprints, and prompting to enter selected right hand fingerprints after the selected left hand fingerprints are entered.

205. Receive a predetermined amount of fingerprint information successively entered by the user based on fingerprint input prompt information.

The fingerprint input prompt information is used to prompt to enter fingerprint information corresponding to the fingerprint identification information, so that the user can enter the corresponding fingerprint information based on the prompt information.

Further, the method includes detecting whether fingerprint information entered by the user is received within a predetermined time period every time prompt information is output; and if no, confirming that identity authentication fails and outputting alarm information indicating that an operation time is out. The predetermined time period starts from a moment when the prompt information is output, and corresponding duration of the time period can be configured based on an actual demand. For example, the duration of the time period can be set to 10 seconds, 20 seconds, etc.

For example, the duration of the predetermined time period can be set to 15 seconds. When prompt information prompting to enter fingerprint information of the right index finger is output, if the fingerprint information entered by the user is not received within 15 seconds starting from the moment when the prompt information is output, it indicates that the operation has timed out, and there is no need to wait to receive the fingerprint information entered by the user. As such, it can be detected whether the user operation times out without performing identity authentication and outputting the alarm information that indicates an operation times out.

206. Match the received predetermined amount of fingerprint information against the selected predetermined amount of fingerprint information.

In the present implementation of the present disclosure, step 206 can include matching each received fingerprint information against fingerprint information entered in response to a prompt request. Step 206 can further include after receiving the predetermined amount of fingerprint information, matching the fingerprint information against the selected predetermined amount of fingerprint information.

207. Confirm that identity authentication succeeds when the received predetermined amount of fingerprint information matches the selected predetermined amount of fingerprint information.

In the present implementation of the present disclosure, step 207 can include confirming that identity authentication succeeds when the received predetermined amount of fingerprint information matches the selected predetermined amount of fingerprint information.

For example, when user identity authentication needs to be performed, the system randomly selects two pieces of fingerprint information: fingerprint information of the right thumb and the right index finger. The system prompts to enter fingerprint information of the right thumb for the first time. When detecting that the fingerprint information entered by the user matches recorded fingerprint information of the right thumb, the system prompts to enter fingerprint information of the right index finger for the second time. When the system detects that the fingerprint information entered by the user matches recorded fingerprint information of the right index finger, it indicates that the received fingerprint information matches the fingerprint information entered in response to the prompt request, and as such, user identity authentication succeeds.

The method further includes confirming that identity authentication fails and outputting alarm information indicating that identity authentication fails when the received predetermined amount of fingerprint information does not match the selected predetermined amount of fingerprint information. When the received predetermined amount of fingerprint information does not match the selected predetermined amount of fingerprint information, that is, there is one or more pieces of fingerprint information that do not match the selected fingerprint information. It indicates that the current operation is not performed by the user or the user enters the wrong fingerprint information, and consequently identity authentication fails and the alarm information indicating that identity authentication fails is output.

According to another method for identity authentication provided in the present implementation of the present disclosure, when identity authentication needs to be performed, a predetermined amount of fingerprint information is first selected from a user's plurality of recorded fingerprints; then, a predetermined amount of fingerprint information successively entered by the user based on fingerprint input prompt information is received; next, the received predetermined amount of fingerprint information is matched against the selected predetermined amount of fingerprint information; and it is confirmed that identity authentication succeeds when the received predetermined amount of fingerprint information matches the selected predetermined amount of fingerprint information. Compared with a current method that only a fixed fingerprint is used for identity authentication, in the present disclosure, a plurality of pieces of fingerprint information of a user are recorded, so that when the user needs securer operation behavior, a predetermined amount of fingerprint information can be selected from the plurality of recorded fingerprints, the user is prompted to enter fingerprint information of a corresponding finger, and a corresponding operation can be completed only when the fingerprint information totally matches. It increases identity authentication complexity, improves security, and can satisfy a user requirement for relatively high privacy or security.

Figure 6:
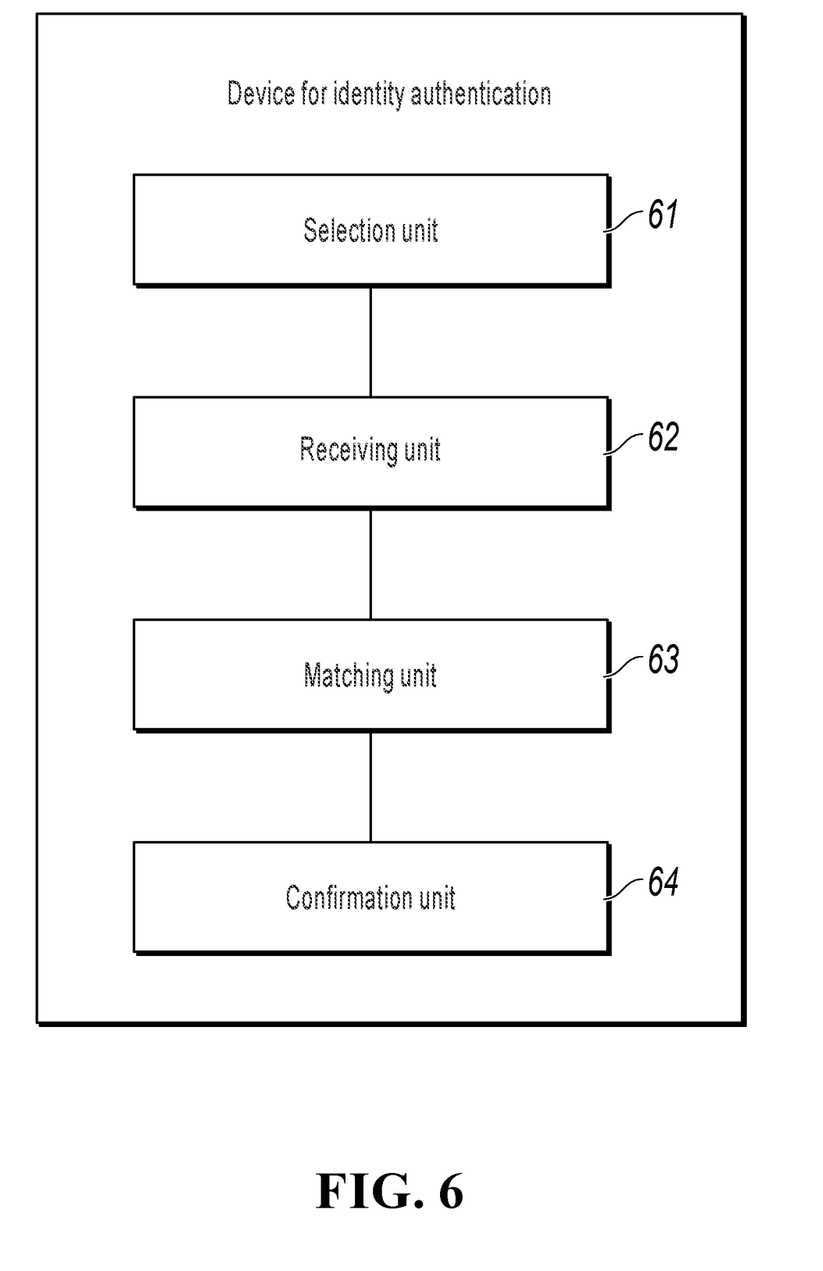
FIG. 6 is a schematic structural diagram illustrating a device for identity authentication, according to an implementation of the present disclosure.

Further, in a specific implementation of the method shown in FIG. 1, an implementation of the present disclosure provides a device for identity authentication. As shown in FIG. 6, the device can include a selection unit 61, a receiving unit 62, a matching unit 63, and a confirmation unit 64.

The selection unit 61 can be configured to select a predetermined amount of fingerprint information from a user's plurality of recorded fingerprints. In the present implementation of the present disclosure, when identity identification with a relatively high security level needs to be performed, the selection unit 61 is triggered to work.

The receiving unit 62 can be configured to receive a predetermined amount of fingerprint information successively entered by the user based on fingerprint input prompt information. The receiving unit 62 is a main function module for receiving the entered fingerprint information in the device, and triggers the matching unit 63 to perform identity authentication.

The matching unit 63 can be configured to match the received predetermined amount of fingerprint information against the selected predetermined amount of fingerprint information. The matching unit 63 is a main function module for performing fingerprint recognition and authentication on the received fingerprint information in the device.

The confirmation unit 64 can be configured to confirm that identity authentication succeeds when the received predetermined amount of fingerprint information matches the selected predetermined amount of fingerprint information.

It is worthwhile to note that the present device implementation corresponds to the previous method implementation. For details, reference can be made to corresponding descriptions in FIG. 1. For ease of reading, details in the previous method implementation are omitted in the present device implementation. However, it should be clear that the device in the present implementation can correspondingly implement all content in the previous method implementation.

According to a device for identity authentication provided in the present implementation of the present disclosure, when identity authentication needs to be performed, a predetermined amount of fingerprint information is first selected from a user's plurality of recorded fingerprints; then, a predetermined amount of fingerprint information successively entered by the user based on fingerprint input prompt information is received; next, the received predetermined amount of fingerprint information is matched against the selected predetermined amount of fingerprint information; and it is confirmed that identity authentication succeeds when the received predetermined amount of fingerprint information matches the selected predetermined amount of fingerprint information. Compared with a current method that only a fixed fingerprint is used for identity authentication, in the present disclosure, a plurality of pieces of fingerprint information of a user are recorded, so that when the user needs securer operation behavior, a predetermined amount of fingerprint information can be selected from the plurality of recorded fingerprints, the user is prompted to enter fingerprint information of a corresponding finger, and a corresponding operation can be completed only when the fingerprint information totally matches. It increases identity authentication complexity, improves security, and can satisfy a user requirement for relatively high privacy or security.

Figure 7:
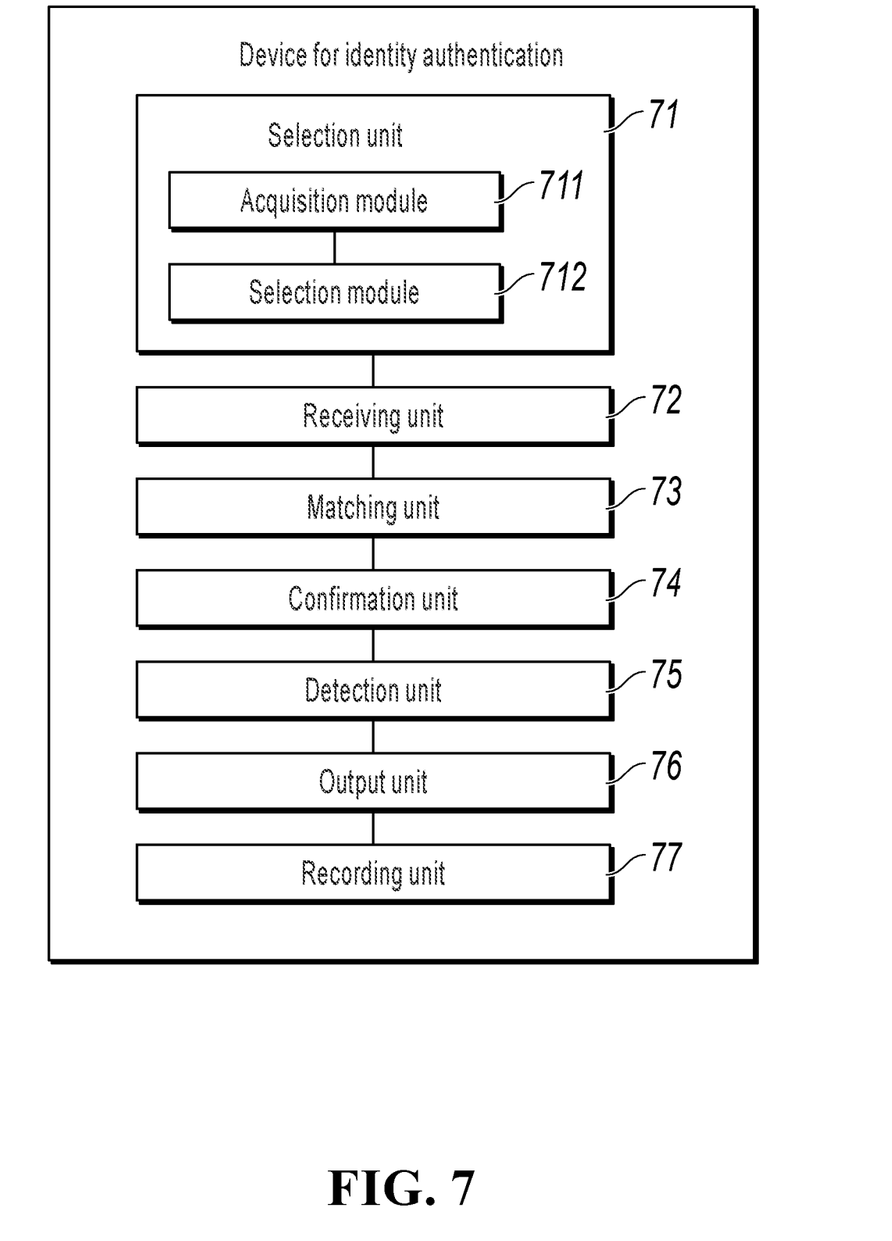
FIG. 7 is a schematic structural diagram illustrating another device for identity authentication, according to an implementation of the present disclosure.

Further, in a specific implementation of the method shown in FIG. 5, an implementation of the present disclosure provides another device for identity authentication. As shown in FIG. 7, the device can include a selection unit 71, a receiving unit 72, a matching unit 73, and a confirmation unit 74.

The selection unit 71 can be configured to select a predetermined amount of fingerprint information from a user's plurality of recorded fingerprints. In the present implementation of the present disclosure, when identity identification with a relatively high security level needs to be performed, the selection unit 71 is triggered to work.

The receiving unit 72 can be configured to receive a predetermined amount of fingerprint information successively entered by the user based on fingerprint input prompt information. The receiving unit 72 is a main function module for receiving the entered fingerprint information in the device, and triggers the matching unit 73 to perform identity authentication.

The matching unit 73 can be configured to match the received predetermined amount of fingerprint information against the selected predetermined amount of fingerprint information. The matching unit 73 is a main function module for performing fingerprint recognition and authentication on the received fingerprint information in the device.

The confirmation unit 74 can be configured to confirm that identity authentication succeeds when the received predetermined amount of fingerprint information matches the selected predetermined amount of fingerprint information.

The matching unit 73 can be configured to match each received fingerprint information against fingerprint information entered in response to a prompt request.

The confirmation unit 74 can be configured to confirm that identity authentication succeeds when received fingerprint information matches the fingerprint information entered in response to the prompt request.

The device further includes a detection unit 75 and an output unit 76.

The detection unit 75 can be configured to detect whether fingerprint information entered by the user is received within a predetermined time period every time prompt information is output.

The confirmation unit 74 can be further configured to confirm that identity authentication fails if the detection unit 75 detects that the fingerprint information entered by the user is not received within the predetermined time period.

The output unit 76 can be configured to output alarm information indicating that an operation time is out.

The confirmation unit 74 can be further configured to confirm that identity authentication fails when the received predetermined amount of fingerprint information does not match the selected predetermined amount of fingerprint information.

The output unit 76 can be further configured to output alarm information indicating that identity authentication fails.

The detection unit 75 can be further configured to detect whether the user is in login status.

The output unit 76 can be further configured to output prompt information prompting the user to log in by using an account if the detection unit 75 detects that the user has not logged in yet.

The selection unit 71 can include an acquisition module 711 and a selection module 712.

The acquisition module 711 can be configured to obtain login account information of the user if it is detected that the user is logged in.

The selection module 712 can be configured to select a predetermined amount of fingerprint information from a plurality of recorded fingerprints corresponding to the account information obtained by the acquisition module 711.

The device further includes a recording unit 77.

The recording unit 77 can be configured to record each fingerprint information entered by the user and fingerprint identification information corresponding to each fingerprint information.

The detection unit 75 can be further configured to detect whether currently entered fingerprint information exists in recorded fingerprint information in a process of recording the fingerprint information entered by the user.

The recording unit 77 can be further configured to stop recording the currently entered fingerprint information if the detection unit 75 detects that the currently entered fingerprint information exists in the recorded fingerprint information.

The output unit 76 can be further configured to output alarm information indicating that a fingerprint is repeatedly entered.

The output unit 76 can be further configured to output prompt information based on fingerprint identification information corresponding to the fingerprint information in a predetermined fingerprint recognition sequence or a random recognition sequence. The prompt information is used to prompt to enter the fingerprint information corresponding to the fingerprint identification information.

It is worthwhile to note that the present device implementation corresponds to the previous method implementation. For details, reference can be made to corresponding descriptions in FIG. 5. For ease of reading, details in the previous method implementation are omitted in the present device implementation. However, it should be clear that the device in the present implementation can correspondingly implement all content in the previous method implementation.

The device for identity authentication includes a processor and a memory. The selection unit, the receiving unit, the matching unit, the confirmation unit, the detection unit, the output unit, the recording unit, etc. are stored in the memory as program units, and the processor executes the program units stored in the memory to implement corresponding functions.

The processor includes a kernel, and the kernel invokes a corresponding program unit from the memory. There can be one or more kernels, and kernel parameters are adjusted, so as to resolve a problem that identity authentication performed by using only a fixed fingerprint is very risky and less secure, and cannot satisfy a user requirement for relatively high privacy or security.

The memory can include a non-permanent memory, a random access memory (RAM) and/or a non-volatile memory in a computer readable medium, for example, a read-only memory (ROM) or a flash memory (flash RAM). The memory includes at least one storage chip.

According to another device for identity authentication provided in the present implementation of the present disclosure, when identity authentication needs to be performed, a predetermined amount of fingerprint information is first selected from a user's plurality of recorded fingerprints; then, a predetermined amount of fingerprint information successively entered by the user based on fingerprint input prompt information is received; next, the received predetermined amount of fingerprint information is matched against the selected predetermined amount of fingerprint information; and it is confirmed that identity authentication succeeds when the received predetermined amount of fingerprint information matches the selected predetermined amount of fingerprint information. Compared with a current method that only a fixed fingerprint is used for identity authentication, in the present disclosure, a plurality of pieces of fingerprint information of a user are recorded, so that when the user needs securer operation behavior, a predetermined amount of fingerprint information can be selected from the plurality of recorded fingerprints, the user is prompted to enter fingerprint information of a corresponding finger, and a corresponding operation can be completed only when the fingerprint information totally matches. It increases identity authentication complexity, improves security, and can satisfy a user requirement for relatively high privacy or security.

The present application further provides a computer program product. When being executed in a data processing device, the computer program product is applicable to execute program code for initialization, which can include the following method steps: selecting a predetermined amount of fingerprint information from a user's plurality of recorded fingerprints; receiving a predetermined amount of fingerprint information successively entered by the user based on fingerprint input prompt information; matching the received predetermined amount of fingerprint information against the selected predetermined amount of fingerprint information; and confirming that identity authentication succeeds when the received predetermined amount of fingerprint information matches the selected predetermined amount of fingerprint information.

A person skilled in the art should understand that the implementations of the present application can be provided as a method, a system, or a computer program product. Therefore, the present application can use a form of hardware only implementations, software only implementations, or implementations with a combination of software and hardware. Moreover, the present application can use a form of computer program product that is implemented on one or more computer-usable storage media (including but not limited to a disk memory, a CD-ROM, an optical memory, etc.) that include computer usable program code.

The present application is described with reference to the flowcharts and/or block diagrams of the method and device for identity authentication, and the computer program product according to the implementations of the present application. It should be understood that computer program instructions can be used to implement each process and/or each block in the flowcharts and/or the block diagrams and a combination of a process and/or a block in the flowcharts and/or the block diagrams. These computer program instructions can be provided for a general-purpose computer, a dedicated computer, an embedded processor, or a processor of another programmable data processing device to generate a machine, so that the instructions executed by a computer or a processor of another programmable data processing device generate a device for implementing a specific function in one or more processes in the flowcharts and/or in one or more blocks in the block diagrams.

These computer program instructions can be stored in a computer readable memory that can instruct the computer or another programmable data processing device to work in a specific way, so that the instructions stored in the computer readable memory generate an artifact that includes an instruction device. The instruction device implements a specific function in one or more processes in the flowcharts and/or in one or more blocks in the block diagrams.

Alternatively, these computer program instructions can be loaded onto a computer or another programmable data processing device, so that a series of operations and steps are executed on the computer or the another programmable device, generating computer-implemented processing. Therefore, the instructions executed on the computer or the another programmable device provide steps for implementing a specific function in one or more processes in the flowcharts and/or in one or more blocks in the block diagrams.

In a typical configuration, the computing device includes one or more processors (CPUs), an input/output interface, a network interface, and a memory.

The memory can include a non-permanent memory, a random access memory (RAM) and/or a non-volatile memory in a computer readable medium, for example, a read-only memory (ROM) or a flash memory (flash RAM). The memory is an example of the computer readable medium.

The computer readable medium includes persistent, non-persistent, movable, and unmovable media that can store information by using any method or technology. The information can be a computer readable instruction, a data structure, a program module, or other data. An example of a computer storage medium includes but is not limited to a phase-change random access memory (PRAM), a static random access memory (SRAM), a dynamic random access memory (DRAM), another-type random access memory (RAM), a read-only memory (ROM), an electrically erasable programmable read-only memory (EEPROM), a flash memory or another memory technology, a compact disc read-only memory (CD-ROM), a digital versatile disc (DVD) or other optical storage, a cassette magnetic tape, tape and disk storage or another magnetic storage device or any other non-transmission media that can be configured to store information that a computing device can access. As described in the specification, the computer readable medium does not include a transitory computer readable medium (transitory media) such as a modulated data signal and carrier.

The previous descriptions are merely implementations of the present application, and are not intended to limit the present application. For a person skilled in the art, the present application can have various changes. Any modification, equivalent replacement, improvement, etc. made without departing from the spirit and principle of the present application shall fall within the scope of the claims of the present application.

Figure 8:
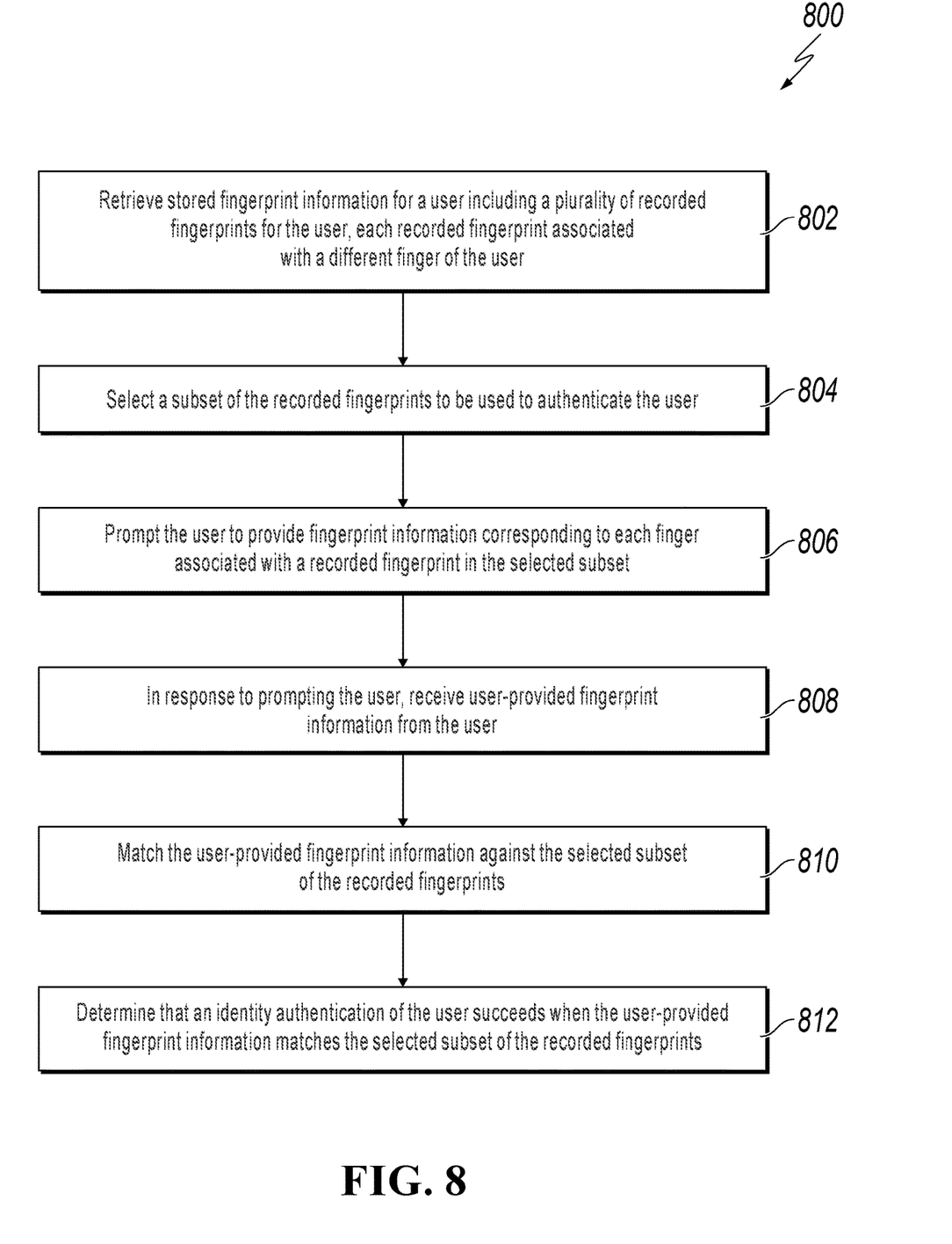
FIG. 8 is a flowchart illustrating an example of a computer-implemented method for using fingerprint information to authenticate a user, according to an implementation of the present disclosure.

FIG. 8 is a flowchart illustrating an example of a computer-implemented method 800 for using fingerprint information to authenticate a user, according to an implementation of the present disclosure. For clarity of presentation, the description that follows generally describes method 800 in the context of the other figures in this description. However, it will be understood that method 800 can be performed, for example, by any system, environment, software, and hardware, or a combination of systems, environments, software, and hardware, as appropriate. In some implementations, various steps of method 800 can be run in parallel, in combination, in loops, or in any order.

At 802, stored fingerprint information for a user is retrieved including a plurality of recorded fingerprints for the user. Each recorded fingerprint associated with a different finger of the user. For example, the selection unit 71 can access previously-stored fingerprint information stored for the user, where the fingerprint information includes fingerprints for different fingers of the user. From 802, method 800 proceeds to 804.

At 804, a subset of the recorded fingerprints is selected to be used to authenticate the user. As an example, the selection unit 71 can select a predetermined amount of fingerprint information from a user's plurality of recorded fingerprints, such as a combination of specific fingers from one or both hands. From 804, method 800 proceeds to 806.

At 806, the user is prompted to provide fingerprint information corresponding to each finger associated with a recorded fingerprint in the selected subset. For example, prompts can be displayed to the user that are similar to the prompts described with reference to FIGS. 2 and 3. The prompts can appear on the user's mobile computing device, for example.

In some implementations, prompting the user to provide fingerprint information corresponding to each finger associated with a recorded fingerprint in the selected subset includes prompting in a predetermined finger order or in a random order. For example, the user can be prompted in a same finger order for each authentication, or the user can be prompted in a random finger order. An example is a set of prompts including a prompt for the user's left index finger followed by a prompt for the user's right thumb. In some implementations, the prompts can be for a different number of fingerprints, such as three fingerprints in one instance, and two fingerprints in another instance. From 806, method 800 proceeds to 808.

At 808, in response to prompting the user, user-provided fingerprint information is received from the user. For example, in response to the prompts described with reference to FIGS. 2 and 3, the user can provide fingerprints for one designated finger followed by one or more other designated fingers, according to the prompts. The fingerprints can be captured by a scanner or other feature on the user's mobile computing device, for example.

In some implementations, method 800 further includes detecting whether user-provided fingerprint information is received within a predetermined time period for each prompt for the fingerprint information. When the predetermined time period is exceeded, the identity authentication of the user fails and alarm information is output that indicates a time out occurred during user entry. For example, if the user takes too much time (for example, 10 seconds) to scan a particular fingerprint, then the user's authentication can fail and a message can be displayed to the user.

In some implementations, method 800 further includes steps for failing user authentication. For example, when the user-provided fingerprint information does not match the selected subset of the recorded fingerprints, then the identity authentication of the user can be determined to fail, and alarm information can be output that indicates that the identity authentication of the user has failed. In some implementations, information regarding failed user authentication attempts can be stored. From 808, method 800 proceeds to 810.

At 810, the user-provided fingerprint information is matched against the selected subset of the recorded fingerprints. For example, the fingerprints provided by the user when prompted as described with reference to FIGS. 2 and 3 can be compared with the previously stored fingerprint information of the user.

In some implementations, matching the user-provided fingerprint information against the selected subset of the recorded fingerprints comprises matching each fingerprint of user-provided fingerprint information against each fingerprint of the selected subset of the recorded fingerprints for the selected fingers of the user. For example, on a finger-by-finger basis, the fingerprints provided by the user can be compared to the previously stored fingerprints of the user for the corresponding fingers. From 810, method 800 proceeds to 812.

At 812, an identity authentication of the user succeeds when the user-provided fingerprint information matches the selected subset of the recorded fingerprints. For example, if all of the comparisons of the user-provided fingerprint match the previously-stored fingerprint information of the user, then a determination can be made that the user has passed user authentication. After 812, method 800 stops.

In some implementations, method 800 further includes steps for obtaining the user's fingerprint information during a user login, such as when logging into the user's account. For example, before retrieving the stored fingerprint information, a determination can be made, such as by detection, whether the user is currently logging into the user's account. When a determination is made that the user is not currently logging in, the user can be prompted to log into an account of the user. During a login sequence, login account information of the user can be obtained that includes login fingerprint information. The login fingerprint information can be used as the user-provided fingerprint information.

In some implementations, method 800 further includes steps to prevent the user from recording the same fingerprint twice. For example, after fingerprint information entered by the user and fingerprint identification information corresponding to the fingerprint information is received, the information can be recorded and stored for use in subsequent authentications of the user. If a determination is made that fingerprint information entered by the user already exists among stored fingerprint information for the user, then receipt of additional fingerprint information for the user can be suspended, and alarm information can be output that indicates that an attempt to repeat entry of fingerprint information has occurred.

Techniques of the present disclosure include the use of fingerprint information for identity authentication of a user. Prior to each user authentication, fingerprint information can be recorded for the user. Subsequently, for a given authentication of the user (such as before making an online payment), a predetermined amount of fingerprint information can be selected from the user's recorded fingerprints. The user can then be prompted to provide fingerprints one-by-one in response to the prompts. Each authorization of the user can include a different set of fingers for which fingerprints are requested, or in a different order. The combinations and variations of fingerprints required for user authentication can improve security of the user.

Embodiments and the operations described in this specification can be implemented in digital electronic circuitry, or in computer software, firmware, or hardware, including the structures disclosed in this specification or in combinations of one or more of them. The operations can be implemented as operations performed by a data processing apparatus on data stored on one or more computer-readable storage devices or received from other sources. A data processing apparatus, computer, or computing device may encompass apparatus, devices, and machines for processing data, including by way of example a programmable processor, a computer, a system on a chip, or multiple ones, or combinations, of the foregoing. The apparatus can include special purpose logic circuitry, for example, a central processing unit (CPU), a field programmable gate array (FPGA) or an application-specific integrated circuit (ASIC). The apparatus can also include code that creates an execution environment for the computer program in question, for example, code that constitutes processor firmware, a protocol stack, a database management system, an operating system (for example an operating system or a combination of operating systems), a cross-platform runtime environment, a virtual machine, or a combination of one or more of them. The apparatus and execution environment can realize various different computing model infrastructures, such as web services, distributed computing and grid computing infrastructures.

A computer program (also known, for example, as a program, software, software application, software module, software unit, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A program can be stored in a portion of a file that holds other programs or data (for example, one or more scripts stored in a markup language document), in a single file dedicated to the program in question, or in multiple coordinated files (for example, files that store one or more modules, sub-programs, or portions of code). A computer program can be executed on one computer or on multiple computers that are located at one site or distributed across multiple sites and interconnected by a communication network.

Processors for execution of a computer program include, by way of example, both general- and special-purpose microprocessors, and any one or more processors of any kind of digital computer. Generally, a processor will receive instructions and data from a read-only memory or a random-access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data. A computer can be embedded in another device, for example, a mobile device, a personal digital assistant (PDA), a game console, a Global Positioning System (GPS) receiver, or a portable storage device. Devices suitable for storing computer program instructions and data include non-volatile memory, media and memory devices, including, by way of example, semiconductor memory devices, magnetic disks, and magneto-optical disks. The processor and the memory can be supplemented by, or incorporated in, special-purpose logic circuitry.

Mobile devices can include handsets, user equipment (UE), mobile telephones (for example, smartphones), tablets, wearable devices (for example, smart watches and smart eyeglasses), implanted devices within the human body (for example, biosensors, cochlear implants), or other types of mobile devices. The mobile devices can communicate wirelessly (for example, using radio frequency (RF) signals) to various communication networks (described below). The mobile devices can include sensors for determining characteristics of the mobile device's current environment. The sensors can include cameras, microphones, proximity sensors, GPS sensors, motion sensors, accelerometers, ambient light sensors, moisture sensors, gyroscopes, compasses, barometers, fingerprint sensors, facial recognition systems, RF sensors (for example, Wi-Fi and cellular radios), thermal sensors, or other types of sensors. For example, the cameras can include a forward- or rear-facing camera with movable or fixed lenses, a flash, an image sensor, and an image processor. The camera can be a megapixel camera capable of capturing details for facial and/or iris recognition. The camera along with a data processor and authentication information stored in memory or accessed remotely can form a facial recognition system. The facial recognition system or one-or-more sensors, for example, microphones, motion sensors, accelerometers, GPS sensors, or RF sensors, can be used for user authentication.

To provide for interaction with a user, embodiments can be implemented on a computer having a display device and an input device, for example, a liquid crystal display (LCD) or organic light-emitting diode (OLED)/virtual-reality (VR)/augmented-reality (AR) display for displaying information to the user and a touchscreen, keyboard, and a pointing device by which the user can provide input to the computer. Other kinds of devices can be used to provide for interaction with a user as well; for example, feedback provided to the user can be any form of sensory feedback, for example, visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments can be implemented using computing devices interconnected by any form or medium of wireline or wireless digital data communication (or combination thereof), for example, a communication network. Examples of interconnected devices are a client and a server generally remote from each other that typically interact through a communication network. A client, for example, a mobile device, can carry out transactions itself, with a server, or through a server, for example, performing buy, sell, pay, give, send, or loan transactions, or authorizing the same. Such transactions may be in real time such that an action and a response are temporally proximate; for example an individual perceives the action and the response occurring substantially simultaneously, the time difference for a response following the individual's action is less than 1 millisecond (ms) or less than 1 second (s), or the response is without intentional delay taking into account processing limitations of the system.

Examples of communication networks include a local area network (LAN), a radio access network (RAN), a metropolitan area network (MAN), and a wide area network (WAN). The communication network can include all or a portion of the Internet, another communication network, or a combination of communication networks. Information can be transmitted on the communication network according to various protocols and standards, including Long Term Evolution (LTE), 5G, IEEE 802, Internet Protocol (IP), or other protocols or combinations of protocols. The communication network can transmit voice, video, biometric, or authentication data, or other information between the connected computing devices.

Features described as separate implementations may be implemented, in combination, in a single implementation, while features described as a single implementation may be implemented in multiple implementations, separately, or in any suitable sub-combination. Operations described and claimed in a particular order should not be understood as requiring that the particular order, nor that all illustrated operations must be performed (some operations can be optional). As appropriate, multitasking or parallel-processing (or a combination of multitasking and parallel-processing) can be performed.

The invention claimed is:

1. A computer-implemented method, comprising:
    receiving fingerprints entered by a user and fingerprint identification information corresponding to the fingerprints;
    recording and storing the fingerprints for use in subsequent authentication of the user;
    detecting whether the fingerprints entered by the user already exists among stored fingerprints for the user; and
    upon determining that that the fingerprints entered by the user already exists among the stored fingerprints for the user, suspending receipt of fingerprints for the user, and outputting alarm information indicating that an attempt to repeat entry of fingerprints has occurred;
    retrieving multiple stored fingerprints for the user, wherein the multiple stored fingerprints each corresponding to a different finger of the user;
    in response to receiving an identity authentication request, randomly selecting two or more of the different fingers of the user for which stored fingerprints were retrieved;
    prompting the user to input fingerprints for each of the randomly selected fingers;
    in response to prompting the user to input fingerprints for each of the randomly selected fingers, receiving the input fingerprints from the user;
    comparing the input fingerprints for each of the randomly selected fingers with the stored fingerprints that correspond to the randomly selected fingers;
    generating a response to the authentication request based on comparing the input fingerprints for each of the randomly selected fingers with the stored fingerprints that correspond to the randomly selected fingers; and
    transmitting the response to the authentication request.

2. The method of claim 1, further comprising:
    detecting whether a fingerprint for each of the randomly selected fingers is received within a predetermined time period for each prompt for the fingerprint; and
    when the predetermined time period is exceeded, determining that the identity authentication of the user fails and outputting alarm information indicating a time out occurred during user entry.

3. A non-transitory computer-readable storage medium coupled to one or more computers and configured with instructions executable by the one or more computers to:
    receive fingerprints entered by a user and fingerprint identification information corresponding to the fingerprints;
    record and storing the fingerprints for use in subsequent authentication of the user;
    detect whether the fingerprints entered by the user already exists among stored fingerprints for the user; and
    upon determining that that the fingerprints entered by the user already exists among the stored fingerprints for the user, suspend receipt of fingerprints for the user, and outputting alarm information indicating that an attempt to repeat entry of fingerprints has occurred;
    retrieve multiple stored fingerprints for the user, wherein the multiple stored fingerprints each corresponding to a different finger of the user;
    in response to receiving an identity authentication request, randomly select two or more of the different fingers of the user for which stored fingerprints were retrieved;
    prompt the user to input fingerprints for each of the randomly selected fingers;
    in response to prompting the user to input fingerprints for each of the randomly selected fingers, receive the input fingerprints from the user;
    compare the input fingerprints for each of the randomly selected fingers with the stored fingerprints that correspond to the randomly selected fingers;
    generate a response to the authentication request based on comparing the input fingerprints for each of the randomly selected fingers with the stored fingerprints that correspond to the randomly selected fingers; and
    transmit the response to the authentication request.

4. The non-transitory computer-readable storage medium of claim 3, further configured with instructions executable by the one or more computers to:
    detect whether a fingerprint for each of the randomly selected fingers is received within a predetermined time period for each prompt for the fingerprint; and
    when the predetermined time period is exceeded, determine that the identity authentication of the user fails and outputting alarm information indicating a time out occurred during user entry.

5. A system, comprising:
    one or more computers; and
    one or more computer-readable memories coupled to the one or more computers and configured with instructions executable by the one or more computers to:
        receive fingerprints entered by the user and fingerprint identification information corresponding to the fingerprints;
        record and storing the fingerprints for use in subsequent authentication of the user;

detect whether the fingerprints entered by the user already exists among stored fingerprints for the user; and upon determining that that the fingerprints entered by the user already exists among the stored fingerprints for the user, suspend receipt of fingerprints for the user, and outputting alarm information indicating that an attempt to repeat entry of fingerprints has occurred:

retrieve multiple stored fingerprints for the user, wherein the multiple stored fingerprints each corresponding to a different finger of the user;

in response to receiving an identity authentication request, randomly select two or more of the different fingers of the user for which stored fingerprints were retrieved;

prompt the user to input fingerprints for each of the randomly selected fingers;

in response to prompting the user to input fingerprints for each of the randomly selected fingers, receive the input fingerprints from the user;

compare the input fingerprints for each of the randomly selected fingers with the stored fingerprints that correspond to the randomly selected fingers;

generate a response to the authentication request based on comparing the input fingerprints for each of the randomly selected fingers with the stored fingerprints that correspond to the randomly selected fingers; and transmit the response to the authentication request.

6. The system of claim 5, further configured with instructions executable by the one or more computers to:

detect whether a fingerprint for each of the randomly selected fingers is received within a predetermined time period for each prompt for the fingerprint; and when the predetermined time period is exceeded, determine that the identity authentication of the user fails and outputting alarm information indicating a time out occurred during user entry.

* * * * *